US006888624B2

(12) United States Patent
Caplette et al.

(10) Patent No.: US 6,888,624 B2
(45) Date of Patent: May 3, 2005

(54) METHOD FOR MEASURING POLARIZATION DEPENDENT LOSS AND INSERTION LOSS

(75) Inventors: Stéphane Caplette, Longueuil (CA); Sylvain Cloutier, Providence, RI (US); Charles Massicotte, Montreal (CA); Alain Villeneuve, Montreal (CA)

(73) Assignees: ITF Technologies Optiques Inc., Montreal (CA); ITF Optical Technologies Inc., Montreal (CA)

( * ) Notice: Subject to any disclaimer, the term of this patent is extended or adjusted under 35 U.S.C. 154(b) by 90 days.

(21) Appl. No.: 10/398,318

(22) PCT Filed: Feb. 8, 2002

(86) PCT No.: PCT/CA02/00160

§ 371 (c)(1),
(2), (4) Date: Apr. 7, 2003

(87) PCT Pub. No.: WO02/065085

PCT Pub. Date: Aug. 22, 2002

(65) Prior Publication Data

US 2004/0001202 A1 Jan. 1, 2004

(30) Foreign Application Priority Data

Feb. 14, 2001 (CA) .......................................... 2336753

(51) Int. Cl.[7] .............................................. G01N 21/00
(52) U.S. Cl. ................................................. 356/73.1
(58) Field of Search ............... 356/73.1; 385/100–121; 398/9–38

(56) References Cited

U.S. PATENT DOCUMENTS

| | | | |
|---|---|---|---|
| 5,227,623 A | 7/1993 | Heffner | 250/225 |
| 5,298,972 A | 3/1994 | Heffner | 356/364 |
| 5,371,597 A | 12/1994 | Favin et al. | 356/367 |
| 5,965,874 A | 10/1999 | Aso et al. | 250/225 |
| 6,043,922 A * | 3/2000 | Koga et al. | 398/213 |
| 6,147,757 A * | 11/2000 | Shen et al. | 356/364 |
| 6,493,474 B1 * | 12/2002 | Yao | 385/11 |

FOREIGN PATENT DOCUMENTS

EP        0536538        4/1993     ............ G01J/4/00

OTHER PUBLICATIONS

Yihong Zhu et al.; A Comparison of Wavelength Dependent . . . ; Dec. 2000; pp. 1231–1239; IEEE Transactions on Instrumentation . . .

* cited by examiner

*Primary Examiner*—Tu T. Nguyen
(74) *Attorney, Agent, or Firm*—George J. Primak

(57) ABSTRACT

This invention provides a method of obtaining accurate measurements of polarization dependent loss and insertion loss during the tests aiming at measuring the polarization properties of optical components. This is achieved by taking into account every polarization disturbance in the line between generation of known states of polarization and the device under test. The method involves computing within a desired range of wavelengths either the transfer matrix of each polarization perturbing element or of all polarization perturbing elements as a whole, and compensating for errors introduced by these polarization perturbing elements.

6 Claims, 2 Drawing Sheets

METHOD FOR MEASURING POLARIZATION DEPENDENT LOSS AND INSERTION LOSS

FIELD OF THE INVENTION

This invention relates to a method for accurately measuring polarization dependent loss (PDL) and insertion loss (IL). More specifically, it relates to a method for compensating the polarization errors introduced during the tests aiming at measuring the polarization properties of optical components. In particular, it relates to a method that compensates for perturbations of the states of polarization occurring in the line between the generation of input polarizations and the device under test (DUT).

BACKGROUND OF THE INVENTION

The performance of a fiber optic system is assessed through various parameters, such as insertion loss (IL), polarisation dependent loss (PDL) and polarization mode dispersion (PMD). Among the few methods known to calculate the PDL, the method of using the Mueller matrix makes possible accurate and rapid measurements. It consists in launching four different orthogonal states of polarization to a DUT. The measurement of the optical power transmitted in these four polarization states enables the calculation of the PDL of the component. One application of the method is disclosed in U.S. Pat. No. 5,371,597.

As is known, for determining the PDL and the IL, a polarization controller is needed to generate four orthogonal states of polarization. The polarization controller typically comprises a polarizer and fractional-wave plates, also referred to as retardation plates or birefringent plates or phase shifters. The polarizer insures a constant linear input polarization. The fractional-wave plates are orientated so as to obtain desired polarization states.

Knowing the input signal by its Stokes vector $S_{ij\ in}$ each state of polarization, the Stokes vector $S_{ij\ out}$ of the output signal is obtained by multiplication using the Mueller matrix $m_{ij}$. To determine the PDL and IL, the only terms that one needs to obtain are those of the top row of the Mueller matrix ($m_{ij}$).

OBJECTS AND SUMMARY OF THE INVENTION

It is an object of the present invention to provide an improved method for accurately measuring PDL and IL by compensating for the polarization errors introduced during such measurement.

Another object is to provide a method that allows accurate PDL and IL measurements within a range of wavelengths.

Still another object is to provide a method that allows simultaneous measurements of several devices with accuracy.

Other objects and advantages of the invention will be apparent from the following description thereof.

Normally, to obtain the PDL and the IL of the DUT, four scannings are carried out successively with four orthogonal polarization states on the Poincaré sphere. Polarizations thus generated by the polarization controller are, for instance, the horizontal linear polarization, the linear vertical polarization, the linear polarization at 45° and the right-hand circular polarization.

In matrix formalism, the transfer matrix of the DUT, referred to a $[M_{ij}]$, relates the output polarization matrix $[S_{ij\ out}]$ measured for these four independent input states of polarization represented by matrix $[S_{ij\ in}]$ according to the following equation;

$$[S_{ij\ out}] = [M_{ij}][S_{ij\ in}] \qquad (1)$$

With known input polarizations ($[S_{ij\ in}]$), the measurement at the output ($[S_{ij\ out}]$) is sufficient to determine the transfer or Mueller matrix of the DUT by resolution of a system of equations. The influence on transmission depending of incident polarization (PDL) is contained in the 4 terms of the top row of the Mueller matrix $$\begin{bmatrix} S_{11out} & S_{12out} & S_{13out} & S_{14out} \\ \cdot & \cdot & \cdot & \cdot \\ \cdot & S_{ijout} & \cdot & \cdot \\ \cdot & \cdots & \cdot & \cdot \end{bmatrix} =$$

$$\begin{bmatrix} m_{11} & m_{12} & m_{13} & m_{14} \\ \cdot & \cdot & \cdot & \cdot \\ \cdot & m_{ij} & \cdot & \cdot \\ \cdot & \cdot & \cdot & \cdot \end{bmatrix} \cdot \begin{bmatrix} S_{11in} & S_{12in} & S_{13in} & S_{14in} \\ S_{21in} & S_{22in} & S_{23in} & S_{24in} \\ S_{31in} & S_{32in} & S_{33in} & S_{34in} \\ S_{41in} & S_{42in} & S_{43in} & S_{44in} \end{bmatrix}$$

where the $S_{1j\ out}$ are powers measured at the output and the $S_{ij\ in}$, with i=1, 2, 3, 4 the matrix row index and j=1, 2, 3, 4 the matrix column index, characterize the input polarizations.

Once these elements $m_{ij}$ are computed, the transmission coefficients $t_j$ defined as the measured power, referred to as Mes, which is the power transmitted measured at the output of the DUT compared to the reference power, referred to as Ref, which is the power in absence of the DUT, are obtained as functions of said elements $m_{ij}$ of the top row of the Mueller matrix:

$$t_j = S_{1j\ out}/S_{1j\ in} = \mathrm{Mes}(j)/\mathrm{Ref}(j) = f(m_{ij})$$

In particular, in the case of four orthogonal polarization states on the Poincaré sphere such as the linear vertical polarization, the linear polarization at 45° and the right-hand circular polarization, the four elements $m_{ij}$ of the top row of the Mueller matrix are obtained as:

$$m_{11} = \tfrac{1}{2}(t_1 + t_2) \quad m_{12} = \tfrac{1}{2}(t_1 - t_2) \quad m_{13} = (t_3 - m_{11}) \quad m_{14} = (t_4 - m_{11})$$

In any case, the PDL and the IL are calculated according to the following equations:

$$PDL = 10\ \log\frac{t_{max}}{t_{min}}\ (\mathrm{dB}) \qquad (2)$$

$$IL = 10\ \log M_{11} \qquad (3)$$

where the $t_{max}$ and $t_{min}$, are the maximum and minimum transmissions respectively, defined for any four independent states of polarization according to the following relations:

$$t_{max} = m_{11} + \sqrt{m_{12}{}^2 + m_{13}{}^2 + m_{14}{}^2} \qquad (4)$$

$$t_{min} = m_{11} - \sqrt{m_{12}{}^2 + m_{13}{}^2 + m_{14}{}^2} \qquad (5)$$

To generate the four desired states of polarization, a typical polarization controller comprises a linear polarizer and fractional-wave plates, for instance a quarter-wave plate and a half-wave plate. These elements introduce wavelength-dependant non-orthogonality of the states of polarization. Fractional-wave plates of the true-zero order type can be used, which are characterized by reduced wavelength dependence. However, as any fractional-wave plate, they are designed for a given wavelength, referred to as their optimized wavelength $\lambda_c$. When measuring the polarization properties at wavelengths around $\lambda_c$, there is no need to compensate since the fractional-wave plates do not significantly disturb the orthogonality of the states of polarization. However, when operating at other wavelengths, the plates induce non-orthogonality that cannot be overlooked and must be compensated for.

By way of example, in the case of fractional-wave plates optimized around $\lambda_c$=1540 nm, the orientations shown in Table 1 below are used to generate the four desired states of polarization at the wavelength $\lambda$=1540 nm.

TABLE 1

| Polarization state | Orientation of the polarizer | Orientation of the $\lambda$/4 plate ($\alpha$) | Orientation of the $\lambda$/2 plate ($\gamma$) |
|---|---|---|---|
| Linear horizontal | $\beta$ | $\beta$ + 0° | $\beta$ + 0° |
| Linear vertical | $\beta$ | $\beta$ + 0° | $\beta$ + 45° |
| Linear 45° | $\beta$ | $\beta$ + 0° | $\beta$ + 22.5° |
| Right-hand circular | $\beta$ | $\beta$ + 45° | $\beta$ + 0° |

The angle $\gamma$ characterises the orientation of the half-wave plate with respect to the polarizer, while the angle $\alpha$ characterises the orientation of the quarter-wave plate with respect to the polarizer.

When measuring at a wavelength other than optimal wavelength $\lambda_c$ of the fractional wave plates, it is possible to compensate for the non-orthogonality induced by the retardation plates by a judicious choice of the angle $\gamma$ of the half-wave plate and of the angle $\alpha$ of the quarter-wave plate. An example of a set of orientations for carrying out measurements around 1520 nm instead of 1540 nm which is the optimized wavelength of the fractional-wave plates is given in Table 2 below:

TABLE 2

| Polarization state | Orientation of the polarizer | Orientation of the $\lambda$/4 plate ($\alpha$) | Orientation of the $\lambda$/2 plate ($\gamma$) |
|---|---|---|---|
| Linear horizontal | $\beta$ | $\beta$ + 0° | $\beta$ + 0° |
| Linear vertical | $\beta$ | $\beta$ + 0° | $\beta$ + 44.3° |
| Linear 45° | $\beta$ | $\beta$ + 0° | $\beta$ + 22.0° |
| Right-band circular | $\beta$ | $\beta$ + 46.2° | $\beta$ + 0° |

However, this type of compensation requires defining a reference each time the measurement is needed at a different wavelength, which can be time-consuming. Furthermore, this type of compensation does not take into account the variations that occur inside the wavelength range of measurements.

In order to be able to test more than one DUT at a time, and for power monitoring, an optical splitter is preferably used at the output of the polarization controller. However, such an arrangement is not straightforward since, on the one hand the Mueller method requires that the four states of polarization at the entrance of the DUT be orthogonal on the Poincaré sphere, and on the other hand optical splitters may not maintain orthogonality of the states of polarization. This may be caused by the presence of PDL in the optical splitters themselves.

It has been found that the above effects induced by the non-orthogonality of the states of polarization on the measurements of PDL and IL can be compensated for in accordance with the present invention.

In essence, therefore, the invention provides a method of obtaining accurate polarization dependent loss (PDL) and insertion loss (IL) measurement, taking into account every polarization perturbation having a transfer matrix in a line between generation of known states of polarization and a device under test (DUT), which comprises computing within a desired range of wavelengths the transfer matrix of each polarization perturbing element in the line between the generation of known states of polarization and the DUT, or the transfer matrix of all polarization perturbing elements as a whole, and compensating for errors introduced along said line by said polarization perturbing elements, so as to obtain an accurate measurement of the PDL and the EL of the DUT.

DETAILED DESCRIPTION OF THE PREFERRED EMBODIMENTS

Figure 1:
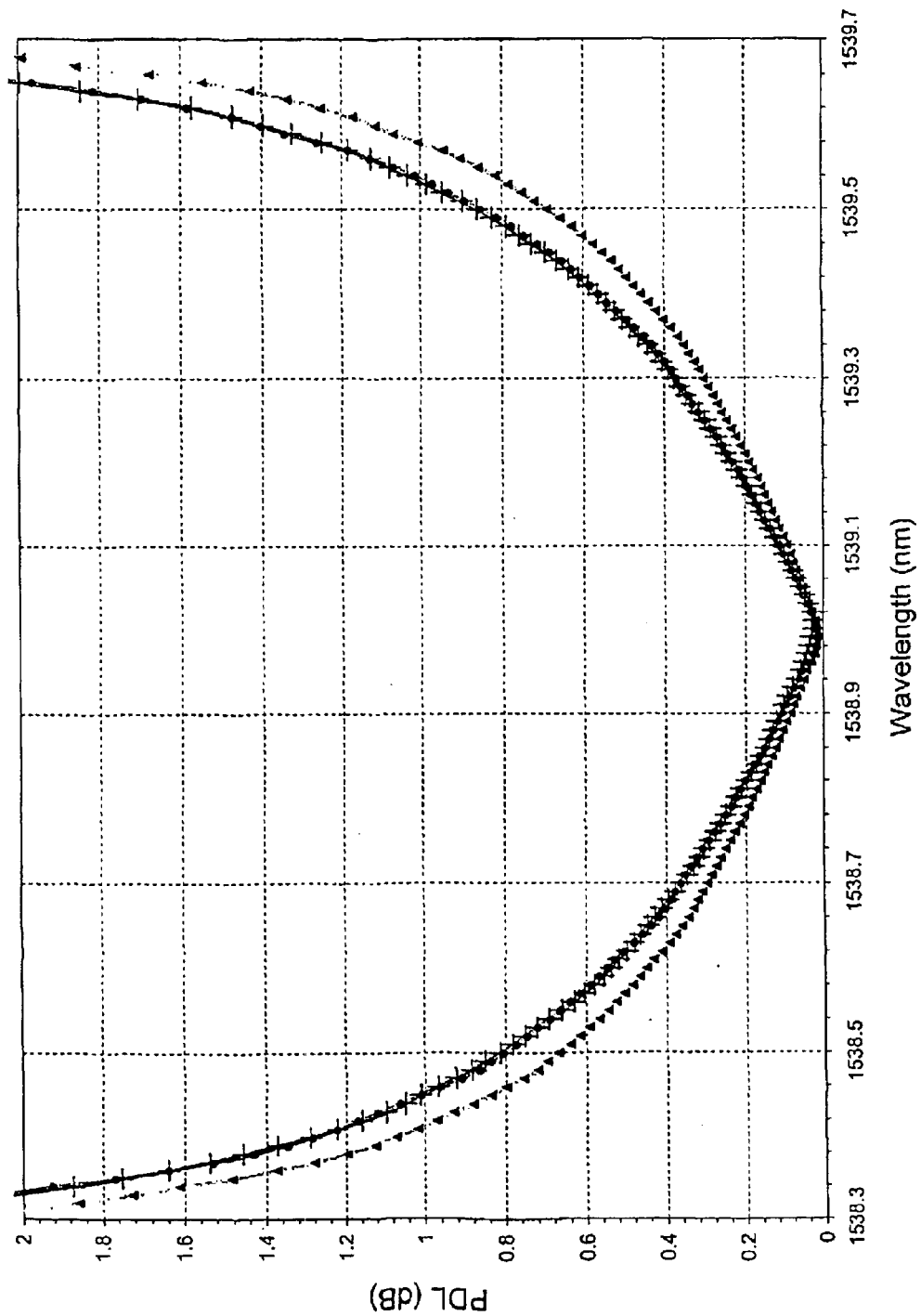
FIG. 1 is a graph showing curves of PDL in dB versus wavelength in nm, obtained without perturbations, with perturbations and with compensation of the perturbations in accordance with the present invention.

According to the present invention, compensation of the errors introduced along the line, from the generation of incident states of polarization to the point where the PDL and EL measurements are done, permits accurate PDL and IL measurements wtihin a range of wavelengths. The novel compensation method permits to accurately calculate the PDL and IL of an optical device within a desired range of wavelengths.

In a first embodiment, the compensation method disclosed is based on the calculation or measurement of the transfer matrix of every element disturbing the orthogonality of the states of polarization in the line between the point where the incident states of polarization are generated and the point where PDL or IL of the DUT is to be measured.

In terms of the matrix formalism introduced, equation (1) must be corrected to take into account all these polarization perturbations:

$$\lfloor S_{ij\ out}\rfloor=\lfloor m_{ij}\rfloor\lvert\text{perturbation}_1\rvert\lvert\text{perturbation}_2\rvert\ldots\lvert S_{ij\ in}\rfloor \quad (6)$$

where, |perturbation$_1$|, |perturbation$_2$|etc . . . are the transfer matrices of each polarization-perturbing element. These include the transfer matrix of the fractional-wave plates of the polarization controller when used at a wavelength different from their optimized wavelength. Furthermore, in the event that an optical splitter is used at the output of the polarization controller, the transfer matrix, referred to as [$S_{canal-n}(\lambda)$], of each one of the n channels of the optical splitter is calculated. This wavelength-dependent matrix is included in the product of matrices defining the polarization perturbations in equation (6). Thus, an accurate DUT transfer matrix $\lfloor m_{ij}\rfloor$ is obtained by solving the equation (6) as opposed to equation (1) where no polarization errors are included. Consequently, the transmission coefficients $t_j$ are also accurately computed, allowing the accurate determination of the PDL and the IL of the DUT by means of equations (2) to (5) and (6).

In a second embodiment, instead of characterizing the transfer matrix of every polarization-perturbing element in the line for each wavelength in the desired wavelength range of measurement, it is possible to measure the output states of polarization at each wavelength in said range of measurement with a polarization analyzer for any four independent polarization states provided these are four independent polarization states. That method amounts to considering the following relation between the input polarizations $\lfloor S_{ij\ in} \rfloor$ and the measured output polarizations $\lfloor S_{ij\ out} \rfloor$:

$$\lfloor S_{ij\ out} \rfloor = \lfloor m_{ij} \rfloor [\text{perturbations}] \lfloor S_{ij\ in} \rfloor \quad (7)$$

where $\lfloor m_{ij} \rfloor$ is the Mueller or transfer matrix of the DUT and [perturbations] is the matrix incorporating all the polarization-perturbing elements taken as a whole.

Thus the transfer matrix $\lfloor m_{ij} \rfloor$ of the DUT is computable with accuracy. This second embodiment permits to obtain the polarization input independent equations for the terms of the first row of the Mueller matrix and thereby allows to obtain a most accurate PDL and IL calculation.

In a further embodiment, the relation (7) in used in order to compute the states of polarization that must be inputted into the line ($\lfloor S_{ij\ in} \rfloor$) so as to obtain four orthogonal states of polarization at the input of the DUT. Therefore, the matrix product of the matrix of the perturbations by so determined matrix $\lfloor S_{ij\ in} \rfloor$ gives the orthogonal polarization states at the input of the DUT, which directly allows the calculation of the PDL and IL of the DUT according to equations (2) to (5).

FIG. 1 provides an illustration of the invention with reference to PDL measurement. In this figure, the plotted crosses provide a curve of PDL in dB versus wavelength in nm for an ideal case of non perturbed polarization states. The plot of triangles shows a response obtained in a real case where a preturbation of 0.15 dB is introduced by the presence of a splitter on the line between the polarization controller and the DUT, or by the use of a polarization controller with fractional-wave plates that are used within a range of wavelengths different by more than 50 nm from their optimized wavelength This line is clearly outside of the ideal curve. Finally, a plot made with dots produces a compensated line in accordance with the method of the present invention which corrects the line with the perturbation into an essentially ideal curve.

Figure 2:
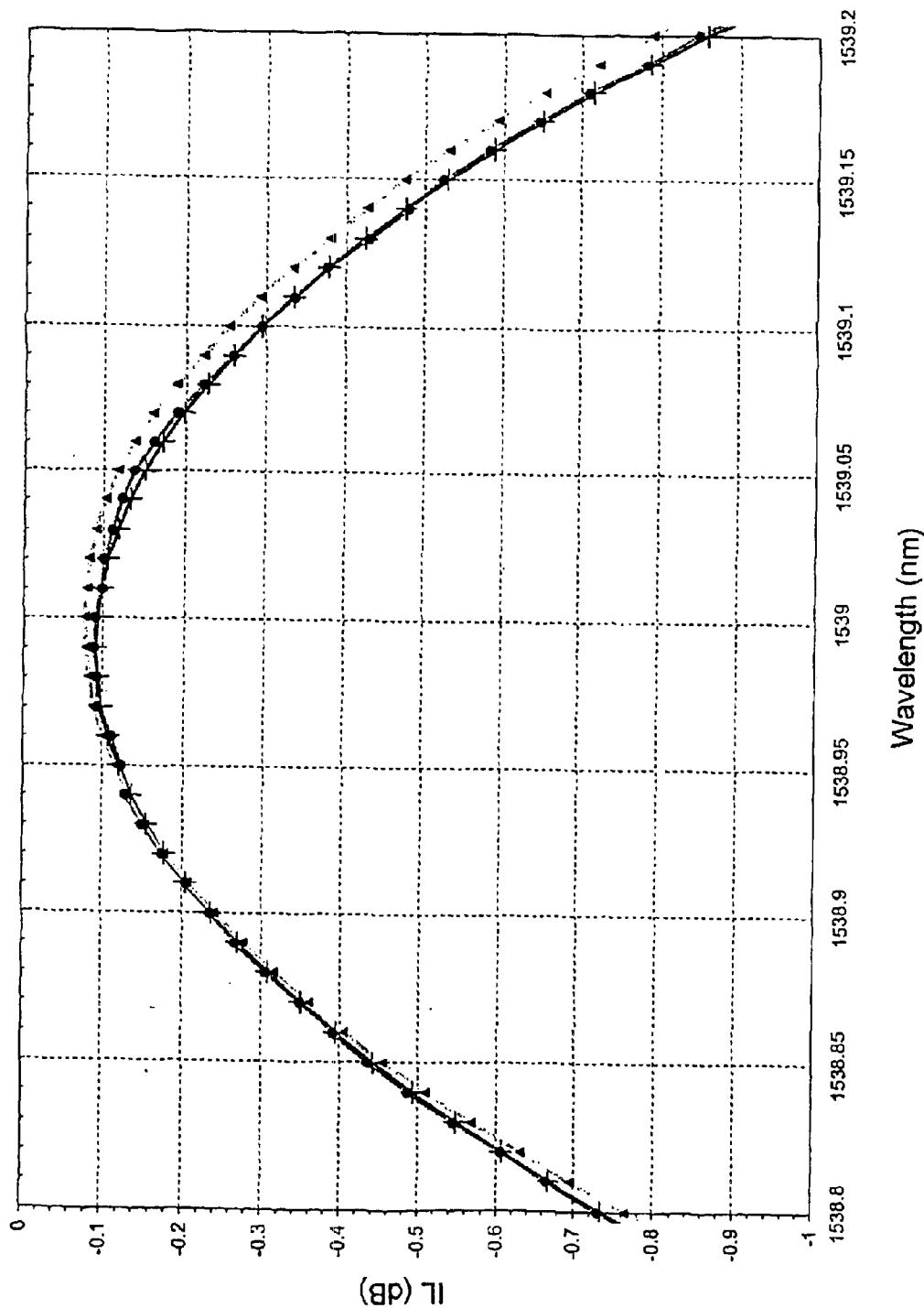
FIG. 2 is a graph showing curves of IL in dB versus wavelength in nm, obtained without perturbations, with perturbation and with compensation of the perturbations in accordance with the present invention.

FIG. 2 provides the same illustration for the measurement of IL as done in FIG. 1 for PDL. Here again the crosses represent the ideal curve of IL in dB versus wavelength in nm obtained with non-perturbed polarization states. The plot with triangles represents a curve with a perturbation by means of a splitter between the polarization controller and the DUT, which has a PDL of 0.15 dB or due to fractional-wave plates in the polarization controller that are used within a range of wavelengths different by more than 50 nm from their optimized wavelength. Finally, the plot obtained with dots produces a line compensated in accordance with the method of the present invention and which corrects the non-compensated line into an essentially ideal curve.

The invention is not limited to the specific embodiments described above, but obvious modifications may be made therein by those skilled in the art without departing from the invention and the scope of the following claims.

We claim:

1. Method of obtaining accurate polarization dependent loss (PDL) and insertion loss (IL) measurement, taking into account every polarization disturbance having a transfer matrix in a line between generation of known states of polarization and a device under test (DUT), which comprises computing within a desired range of wavelengths the transfer matrix of each polarization perturbing element in the line between the generation of known states of polarization and the DUT using the following equation:

$$\lfloor S_{ij\ out} \rfloor = \lfloor m_{ij} \rfloor \lfloor S_{ij\ in} \rfloor$$

in which $\lfloor m_{ij} \rfloor$ is the transfer matrix of the DUT, $\lfloor S_{ij\ out} \rfloor$ is the output polarization matrix of each element, and $\lfloor S_{ij\ in} \rfloor$ is the matrix of input state of polarization of each element, and compensating for errors introduced along the line by said polarization perturbing elements by correcting the above equation as follows:

$$\lfloor S_{ij\ out} \rfloor = \lfloor m_{ij} \rfloor |\text{perturbation}_1| |\text{perturbation}_2| \ldots \lfloor S_{ij\ in} \rfloor$$

wherein $|\text{perturbation}_1|$, $|\text{perturbation}_2|$ ... are transfer matrices of each polarization perturbing element, thereby obtaining an accurate measurement of the PDL and the IL of the DUT.

2. Method according to claim 1, in which the polarization perturbing elements include fractional-wave plates of a polarization controller used to perform required measurements.

3. Method according to claim 1, in which the polarization perturbing elements include an optical splitter located at the output of a polarization controller used to perform required measurements.

4. Method of obtaining accurate polarization dependent loss (PDL) and insertion loss (IL) measurement, taking into account every polarization disturbance having a transfer matrix in a line between generation of known states of polarization and a device under test (DUT), which comprises computing within a desired range of wavelengths, the transfer matrix of all polarization perturbing elements as a whole in the line between the generation of known states of polarization and the DUT, using the following formula:

$$\lfloor S_{ij\ out} \rfloor = \lfloor m_{ij} \rfloor \lfloor S_{ij\ out} \rfloor$$

in which $\lfloor m_{ij} \rfloor$ is the transfer matrix of the DUT, $\lfloor S_{ij\ out} \rfloor$ is the output polarization matrix of each element, and $\lfloor S_{ij\ in} \rfloor$ is the matrix of input state of polarization of each element, and compensating for errors introduced along the line by said polarization perturbing elements by correcting the above equation as follows:

$$\lfloor S_{ij\ out} \rfloor = \lfloor m_{ij} \rfloor [\text{perturbations}] \lfloor S_{ij\ in} \rfloor$$

where [perturbations] is the matrix all the polarization perturbing elements taken as a whole, thereby obtaining an accurate measurement of the PDL and the IL of the DUT.

5. Method according to claim 4, in which the polarization perturbing elements include fractional-wave plates of a polarization controller used to perform required measurements.

6. Method according to claim 4, in which the polarization perturbing elements include an optical splitter located at the output of a polarization controller used to perform required measurements.

* * * * *